April 3, 1951 W. M. HUSSON 2,547,469
FRICTION GRIP FOR FLEXIBLE LINES
Filed Aug. 27, 1945 3 Sheets-Sheet 1

INVENTOR.
WILLIAM M. HUSSON
BY

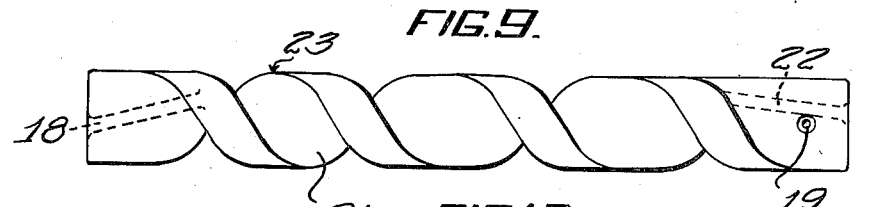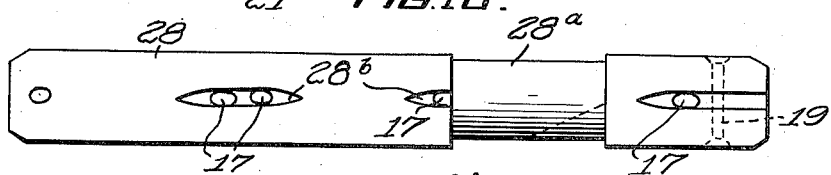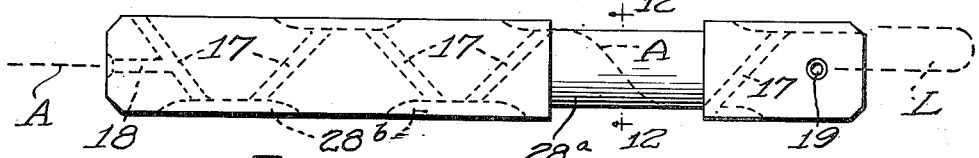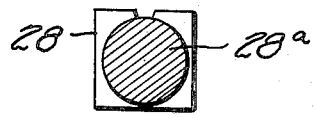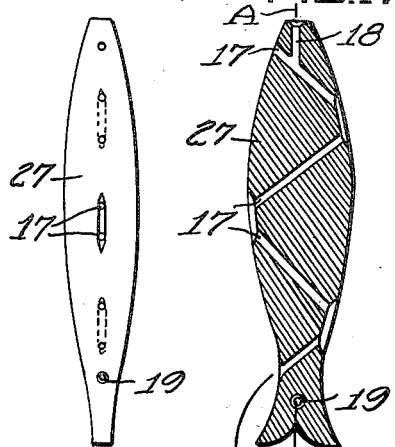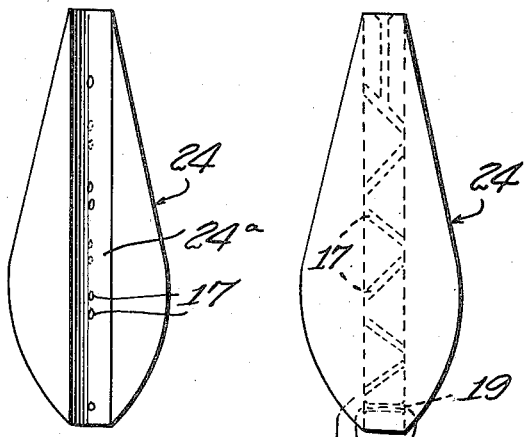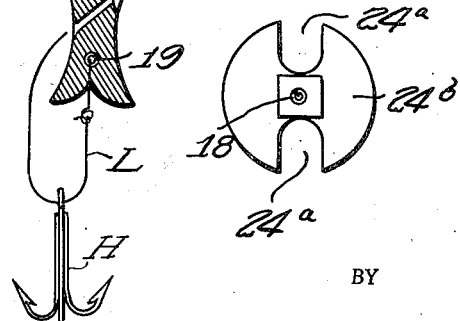

April 3, 1951 W. M. HUSSON 2,547,469
FRICTION GRIP FOR FLEXIBLE LINES
Filed Aug. 27, 1945 3 Sheets-Sheet 3
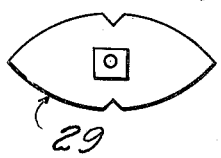
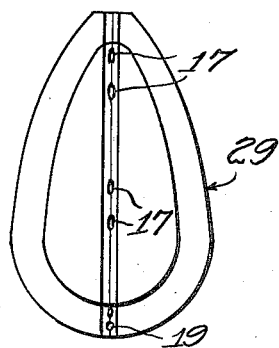
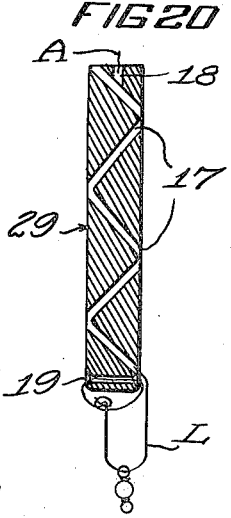
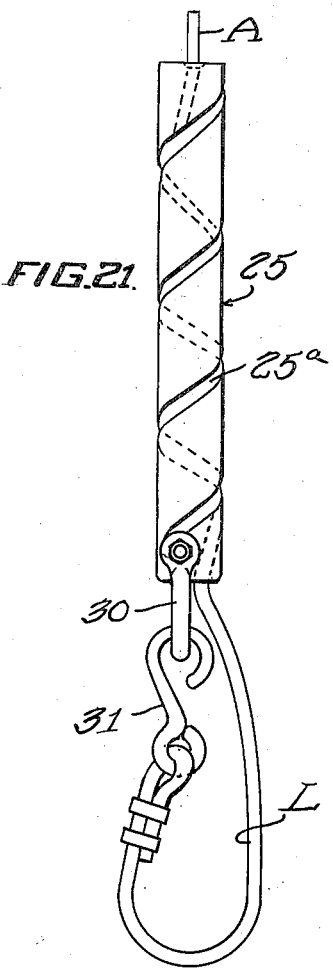
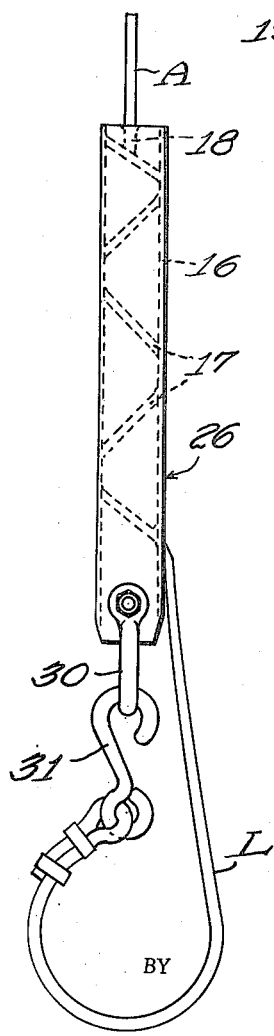
INVENTOR.
WILLIAM M. HUSSON

Patented Apr. 3, 1951

2,547,469

UNITED STATES PATENT OFFICE 2,547,469

FRICTION GRIP FOR FLEXIBLE LINES

William M. Husson, St. Augustine, Fla.

Application August 27, 1945, Serial No. 612,952

1 Claim. (Cl. 24—129)

This invention relates to friction grip devices such as are used in connecting the sections of a flexible line consisting of a plurality of sections necessary to be connected to complete the line. Furthermore the invention relates particularly to a friction grip connector for fish lines and the like.

In connecting two sections of a sectional line it is common to tie the adjacent ends of the sections by a knot such as a square knot, a weaver's knot or the like. Fish lines and the like are designed for definite breaking stresses but when two sections of such a line are knotted together the crossing of one part of the knot over another produces a stress at the crossing point, tending to weaken the line at such point and thus to permit a breaking of the line at the knob under a stress considerably below that withstood by the line as designed for stress.

One principal object of the present invention is to provide a novel friction grip for fish lines and the like, the grip being of such character as to prevent any abnormal stress being exerted at any point in the line.

Another important object of this invention is to provide a novel friction grip for the purpose set forth, the grip being so constructed as to enable a loop to be formed in an end of a line section engaged by said grip.

A further important object of this invention is to provide a novel form of grip whereby the line engaged by said grip may be arranged for different degrees of frictional engagement.

With the above and other objects in view the invention consists in general of certain novel arrangements of parts and construction of details hereinafter fully described, illustrated in the accompanying drawings, and particularly claimed.

In the accompanying drawings, in which similar reference characters indicate similar parts in each of the views;

Fig. 9 is a side elevation of another modification of the invention.

Fig. 10 is a plan view showing the preferred form of my invention as applied to angling activities.

Fig. 11 is a longitudinal sectional view of the preferred form.

Fig. 12 is a sectional view taken on line 12—12 of Fig. 11.

Figs. 13, 14 and 15 are, respectively, a side elevation, and end view, and a top plan view of the invention in a form adapted for use as a float in angling.

Figs. 16 and 17 are, respectively, a top plan view, and a side elevation—partly in section—of the invention in a form adapted for use as a lure or bait in angling.

Figs. 18, 19 and 20 are, respectively, a plan view, a side elevation, and a longitudinal sectional view of the invention in a form adapted for use as a sinker.

Fig. 21 is a side elevation showing one form of the invention as employed in connection with cables or ropes.

Fig. 22 is a similar view of another form of the invention as employed in connection with cables or ropes.

Figure 1:
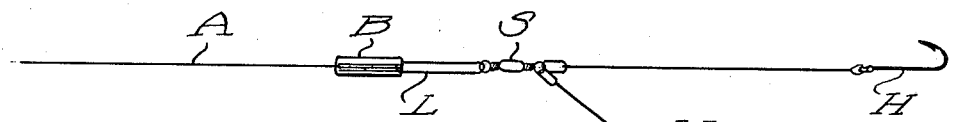
Figure 1 is a diagrammatic view of a portion of an angling assemblage with the invention applied.
Figure 2:
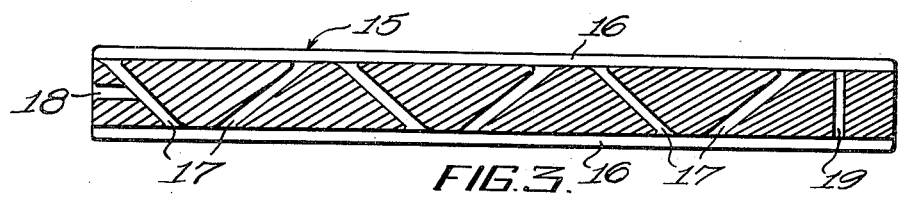
Figures 2, 3 and 4 are respectively, a longitudinal section, a plan view and an end view of one form of the invention.
Figure 3:
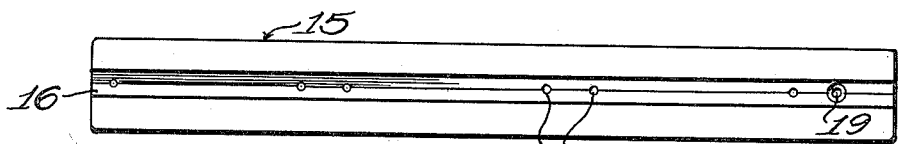
Figures 4, 5, 6:
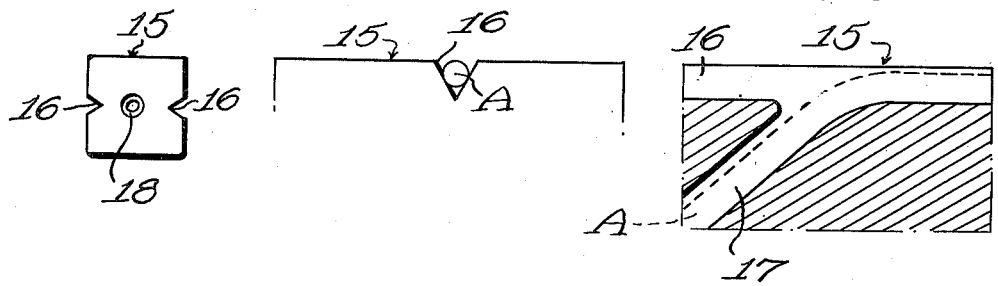
Figure 5 is a fragmentary detail sectional view showing the friction groove.
Fig. 6 is a detail sectional view showing the arrangement for avoiding abrasion of the line.

For explanatory purposes, Fig. 1 is a diagrammatic view showing the hook and zone of a typical tackle arrangement for deep sea fishing, the view including the present invention. The line is indicated at A, the swivel as S, one loop of which is connected with the line A, with the opposite loop carrying the leaders to the hook H and the sinker W, respectively; the exemplification of the present invention is indicated broadly as B. The arrangement differs from the general practice in that in the latter the line A is directly connected to the swivel loop by a suitable knot formation—generally a "fisherman's knot." As will be understood, the pull that is being referred to herein is provided when the hooked fish is attempting to escape against a pressure-set reel or when the angler is attempting to reel in the fish; the hook leader is of great strength—it may be wire—and hence breaking of the line comes within the line itself or at the point where the line is knotted to the swivel.

As will be understood the line of pull or stress under general practice conditions is a straight line extending from the line to the hook through the swivel, with the service line connected to the swivel by a knot; hence, the stress or pull value is applied equally on the line including the knot, The solution of the problems inherent in the aforesaid objects of the invention was found in the development of a simple device which would be mounted on the line and relative to which the line would be positioned, which device, in effect, would set up a path from the friction grip device to the swivel wherethrough the stress is carried by two sides of a loop in the line, each side carrying one-half the total stress, and yet limit the position of the knot to but one of the sides.

The friction grip device of this invention is herein shown in a variety of forms each of which is so constructed as to provide a loop in the line extending from the grip device to a swivel.

A form capable of being used in deep sea fishing—and shown in Figs. 2 to 6 of the drawings—will illustrate the general form of the solution; this form was used in the first two comparative tests indicated above. A member 15, which may be of wood, metal, plastic, or preferred combinations of these, is elongated and—in this particular form—approximately square in cross-section, with two opposite sides each provided with a medial longitudinal recess 16 extending from end to end of the member, the recess being V-shaped in cross-section—it may have curved side walls, if desired. At proper positions the two recesses are connected by openings 17 which cross the axis of the member at an angle of approximately 45°, adjacent openings being at opposite angles; as a result, each of the recesses has opening thereinto the mouths of a succession of pairs of openings, with the mouths of each pair of openings spaced a short distance, while the spacing of the pairs of mouths is considerable, due to the angularity of the openings.

In practice, three pairs of openings are generally employed, although this may be varied if desired. At one end of the member an axial opening 18 is provided reaching to the first opening 17; this permits the line to be threaded through opening 18 into opening 17 along which it extends in an advancing direction to a recess 16 and is then led into the second opening of the pair of openings, along the latter opening to the opposite recess, etc., thus threading the line back and forth in an advancing direction across the axis of the member to the vicinity of the opposite end of the member. The openings have diameters approximately twice the diameter of the line, and at each point where the direction changes the corners are rounded off so as to eliminate fraying of the line. After traversing the openings 17, the line is carried through the swivel loop—if desired, it may be given two turns relative to the swivel loop to reduce line abrasion at this point—and then returned to the member, where it is passed through an opening 19 which extends normal to the member axis, the end of the line then being knotted to the portion of the line approaching the entrance to opening 19, thus completing a pseudo loop (the loop L) with the latter extending through the swivel loop; the distance from the end of the member to the swivel loop should range from one to three inches, approximately, depending upon the conditions.

Figure 7:
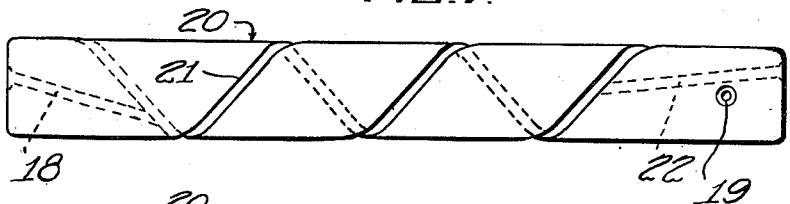
Fig. 7 is a side elevation showing a modified form of the invention.
Figure 8:
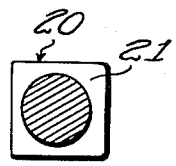
Fig. 8 is a diagrammatic sectional view of Fig. 7, the section being taken along the bottom of one complete convolution of the spiral groove.

As indicated in Figs. 7 and 8, the member formation is not limited to the specific arrangement described above. Instead of the longitudinal recesses 16 and opening 17, the member—indicated at 20—also shown as angular in cross-section, is provided with a peripheral channel 21 arranged somewhat sinuously lengthwise of the member, with the channel of the V-shape characteristic. Opening 18 has its entrance at the axis as before, but extends at a sufficient angle so as to emerge in the channel. And at the opposite end, an opening 22 leads from the channel to the end of the member with the outlet at one side of the axis of the member. In this form the line passes from channel 21 through opening 22 in forming loop L, opening 19 in this case extending across the axis of the member. As shown in Fig. 8, the channel 21 may be and preferably is formed as a spiral of uniform diameter at the channel bottom regardless of the particular contour cross-section of the member. Since the line emerges from opening 22 adjacent the periphery of the member, the dual path characteristic of the pseudo loop L is produced, the loop characteristic being maintained by the frictional engagement of the line in the channel 21, the latter carrying the line out of the direct line of pull and therefore subject to the development of the frictional component values determined by the pulling stress values, as in the form previously described.

The member is not limited in form to a polygonal cross-section, as is apparent from Fig. 9, which discloses a modified form which has the appearance of a twisted spiral, indicated at 26. In effect, the member has the characteristics of member 20, including openings 18, 22 and 19; the distinction lies in the formation of the body which is more or less helical or volute in form, the bottom of the channel presenting characteristics of the bottom of channel 21. The structure is one that can be readily fabricated from metal or plastic, and in service, the action is similar to that of the previous form.

The fundamentals of the invention are not limited to forms in which there is a general similarity in the manner of advancing the line relative to the member to set up the frictional component characteristic. For instance, in Figs. 10 to 12, I have shown a member 28 which has the continuity of the progression varied by including an elongated zone 28a of circular contour and reduced diameter, with the zone taking the place of one of the diagonal openings 17—preferably the opening which precedes the exit opening of the member, since the line emerging from the preceding opening 17 must be carried 180° around portion 28a in order to reach the entrance to the last opening 17, it is apparent that the line has the characteristic of a half-convolution which is symmetrical to the line of pull, and that the entire length of such half-convolution becomes active as a friction-developing source, thus increasing the friction value of the member to assure maintenance of the loop formation. The length of the zone may be varied to meet conditions; for instance, some grades of fishing lines are formed in a manner to reduce friction possibilities—in such case the zone may be lengthened to increase the length of this zone of friction application. This form was the second form employed when making the comparative tests indicated above.

Because of this ability to obtain a desired friction value in simple manner, this particular form of the invention is preferred, since it is possible to provide members adapted for use with particular grades of fishing lines. In this form, the use of the continuous recesses 16 is unnecessary, these being substituted by individual recesses 28b for the line in passing from one opening 17 to the next.

In each of these forms the members are designed to present a balanced condition as far as possible, and each has the characteristic that the line approach to the member is at the axis of the member—thus in the direct line of pull—while the exit from the member to the loop is non-axial to thereby set up the shift from the direct line of pull to the dual path characteristic without affecting the conditions which the usual line of pull action provides; in other words, the delicacies of the fishing technique found in the direct line of pull conditions are obtained in service, in addition to which is found the advantage of the increase in the value of the service breaking strain of the line through decrease in the vulnerability of the knot, as above explained.

While the above description relates more particularly to a fishing assembly of the type shown in Fig. 1, the invention is not limited in this respect, since, as shown in Figs. 13 to 15, it may be utilized with other types, as, for instance, in still-fishing. As indicated in these views, the member may have the buoyant and other characteristics of a fishing float; in such case, the member, indicated at 24, is formed of corkwood or plastic, and includes a body arranged on the type of Fig. 2, with the number of openings 17 sufficient to produce the friction needed to cause the float to maintain its position on the line at all times—the weight of the sinker and bait being sufficient to provide the friction component in the absence of a hooked fish; since the line can be manually shifted at will, the float can be positioned to provide the desired depth by varying the dimensions of loop L for normal depth changes—abnormal changes can be met by varying the length of the leader leading to the hook.

In this form the normal float contour is formed with two oppositely-disposed longitudinal recesses 24a the bottoms of which extend to a body-portion or core 24b which, in effect, corresponds to member 15 and which carries the diagonal openings 17. Threading of the line is similar to the previous forms, the exposed portions of the line being within the recesses 24a.

As indicated in Figs. 16 and 17, the application of the invention to the fishing art can extend also to the field of the lure or bait. In this use the member, indicated at 27, is shown as a simulation of a small fish—this exemplifying various types of lures that are applicable, these extending into the varied types excepting flies—the openings 17 extending in the direction of depth of the lure or bait, the body being slightly recessed in the zones where adjacent openings are exposed; the axial opening 18 is shown as entering the mouth zone of the lure, while the exit leading to the loop formation L is adjacent the tail zone of the lure, the opening 19 being located in the end zone of the tail. In this form, the loop formation forms the end of the fishing line, the loop formation carrying the hook which is shown as exposed.

And, as indicated in Figs. 18 to 20, the invention can be extended to further service in angling, by its use in connection with a sinker normally located in the direct line of pull. In this form the member is indicated as 29, and is somewhat pear-shaped in configuration, but of unequal diameters, thus presenting a thickness readily applicable for the line threading characteristics shown in Fig. 20, by the use of openings 18, 17 and 19, and V-shaped recesses 16. As with the float form, the position of the sinker can be readily adjusted.

While the invention is especially adapted for use in the fishing art to meet the conditions referred to, the invention is not limited to such use but is also applicable for use in connecton with heavier and larger line structures, such, for instance, as cables or ropes of cordage or other types. Such use is indicated in Figs. 21 and 22. It frequently happens that the cable or rope will break at the end knot, tie, or clamp, before it breaks at other points in presence of strain or stress conditions, thus reducing the breaking-strain value of such cable or rope below its rated value. The present invention contemplates meeting these conditions by increasing the service pulling stress value of the cable or rope in the manner above pointed out in connection with fishing lines through setting up the dual stress path and maintaining such path through friction in the manner above pointed out, thus reducing the stress values applied to the portions of the assembly which have previously been found most vulnerable to breaking action.

In this particular service the cable or rope is generally used in a somewhat different type of assembly from that above presented, in that the end of the cable or rope is generally provided with a hook formation by which it is, under prior practice, detachably connected in the assembly, the hook being secured to the line in suitable manner. This arrangement is not changed in the present invention, the opening 19 in the end zone of the member receiving the pintle of a clevis to which the hook is detachably secured in producing loop L, thus permitting ready completion or release of the assembly.

Two forms are shown in the drawings, Fig. 21, indicating a member 25 of the type of Fig. 7, except that it is preferably of circular cross-section, the spiral channel 25a having the characteristics of channel 21 with the axial entrance opening 18 and the non-axial exit opening 22. In the form shown in Fig. 22 the characteristics of the Fig. 2 form are presented, the member 26 in this form utilizing the opposite recesses 16 and diagonal openings 17 presented in the earlier form. In both forms the clevis is indicated at 30 and the hook at 31, the latter being suitably secured at the end of the cable.

As will be understood, the service action of the two forms of cable or rope structures is similar to that heretofore pointed out in connection with the fishing lines, the loop L forming the dual path of pulling stress value which reduced the vulnerability of each of the paths, while the friction values developed by the pulling stress maintains the integrity of the loop. As a result the service breaking-strain values of the cable or rope assembly is increased materially, since the stress values placed on the end knot, the tie, or the clamp, is materially less than would be present under installations of the usual type.

As is apparent, the underlying characteristic of the invention is the fact that the actual line of pull is maintained—leading from the line entrance into opening 18 to the point of loop L which engages the swivel loop (or the corresponding element of the cable or rope assemblage); however, the pulling stress is itself divided through the presence of the member and the loop L, so that the stress leads through the dual path instead of a single path, thereby placing the knot or other securing means in a zone of pressure which is reduced by reason of the divided stress path. To maintain the integrity of the loop in service, the member carries the line out of the direct line of pull—generally in a symmetrical manner—in developing the dual path, with the result that the pulling stress, when applied, seeks to restore the direct line of pull with resultant creation of friction between the line and the member, with the friction value responsive to the pulling stress value. In other words, while the member is present within the line of pull, the actual line of pull remains in the line or the cable or rope. While the physical continuity of the line, cable or rope is actually broken at loop L, the continuity of the line of pull is maintained through the loop contact or connection with the swivel loop or other means through which the line of pull is made manifest.

Hence, the assembly presents all of the advantages accruing through the presence of a direct line of pull provided by the line, cable or rope, and, in addition, has the definite advantage of increasing the service breaking-strain values of the line, cable or rope to bring these values to a closer approach to the rated values of the line, cable or rope placed thereon by the producers. The rated breaking-strain values remain unchanged, but through the advantageous use of the present invention, the inherent effects of service conditions on the line, cable or rope, are made of less value, to thereby increase the service breaking-strain values of the line, cable or rope, doing this by establishing the pulling-stress dual path—and maintaining such dual path—within the line of pull.

While I have herein disclosed the underlying characteristics of the invention and a number of ways in which they may be placed in action, it is apparent that changes and modifications therein may be found desirable or essential in meeting the various exigencies of use and the individual desires of a particular user, and I therefore reserve the right to make any and all such changes or modifications as may be required in meeting the conditions, insofar as the same may fall within the spirit and scope of the invention as expressed in the accompanying claim, when broadly construed.

What is claimed as new is:

In a friction grip for use with flexible lines, an elongated body having a central rectilinear axis, said body having a plurality of pairs of divergent openings spaced along the body from one end to the other end, said openings having their axes in a common plane wherein lies the axis of the body, said openings extending between opposite sides of the body, the openings of each pair having closely spaced mouths at one side of the body and widely spaced mouths at the other side of the body, said body having an axial opening extending from one end of the body to the adjacent divergent opening, said body having a transverse opening adjacent its other end and having an axis normal to the plane of the axes of the divergent openings, said transverse opening lying between the divergent opening nearest the extremity of said other end and said extremity whereby the extremity of a line may be secured through the transverse opening and be lead therefrom to the last mentioned divergent opening to form a hook attaching loop, said body having longitudinally extending grooves with which said mouths communicate, said body having a reduced cylindrical portion intermediate its ends and communicating with the divergent openings at each end of the cylindrical portion.

WILLIAM M. HUSSON.

REFERENCES CITED

The following references are of record in the file of this patent:

UNITED STATES PATENTS

| Number | Name | Date |
|---|---|---|
| 322,501 | Taylor | July 21, 1885 |
| 439,263 | Zein et al. | Oct. 28, 1890 |
| 484,254 | Settle | Oct. 11, 1892 |
| 556,485 | Wilson | Mar. 17, 1896 |
| 572,390 | Weir | Dec. 1, 1896 |
| 689,259 | Weguelin | Dec. 17, 1901 |
| 741,154 | Meyer | Oct. 13, 1903 |
| 784,864 | Landis | Mar. 14, 1905 |
| 1,713,106 | Ulfers | May 14, 1929 |
| 2,028,885 | Ulfers | Jan. 28, 1936 |
| 2,151,609 | Menderman | Mar. 21, 1939 |